United States Patent
Axen

[11] 3,901,923
[45] Aug. 26, 1975

[54] ACYLATED BICYCLIC LACTONES
[75] Inventor: Udo F. Axen, Comstock, Mich.
[73] Assignee: The Upjohn Company, Kalamazoo, Mich.
[22] Filed: Mar. 15, 1973
[21] Appl. No.: 341,679

Related U.S. Application Data
[62] Division of Ser. No. 127,346, March 23, 1971, Pat. No. 3,778,450.

[52] U.S. Cl. .............................................. 260/343.3
[51] Int. Cl.$^2$ ...................................... C07D 307/77
[58] Field of Search .............................. 260/343.3

[56] References Cited
OTHER PUBLICATIONS
Corey; Studies on the Total Synthesis of Prostaglandins, a paper given at a conference entitled Prostaglandins, held by the N.Y. Academy of Sciences, on Sept. 17-19, 1970.

*Primary Examiner*—Donald G. Daus
*Assistant Examiner*—Anne Marie T. Tighe
*Attorney, Agent, or Firm*—Morris L. Nielsen

[57] ABSTRACT
Bicyclic lactone compounds of the formula

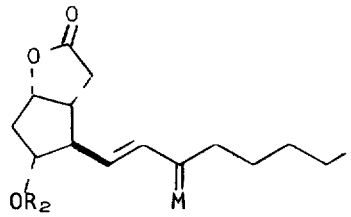

wherein $R_2$ is

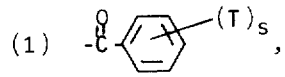

wherein T is alkyl of one to 4 carbon atoms, inclusive, phenylalkyl of 7 to 10 carbon atoms, inclusive, or nitro, and $s$ is zero to 5, inclusive provided that not more than two T's are other than alkyl, and that the total number of carbon atoms in the T's does not exceed 10 atoms;

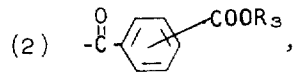

wherein $R_3$ is alkyl of one to 4 carbon atoms, inclusive; or

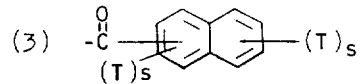

wherein T and $s$ are as defined above; and M is O =, or

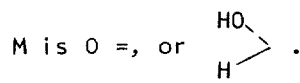

These compounds are useful intermediates in preparing prostaglandins having pharmacological utility.

5 Claims, No Drawings

ACYLATED BICYCLIC LACTONES

CROSS REFERENCE TO RELATED APPLICATIONS

This application is a divisional application of my then copending application Ser. No. 127,346, filed Mar. 23, 1971, now issued as U.S. Pat. No. 3,778,450.

BACKGROUND OF THE INVENTION

This invention relates to intermediates useful in the preparation of prostaglandins and to a process for preparing them.

Each of the known prostaglandins is a derivative of prostanoic acid which has the following structure and atom numbering:

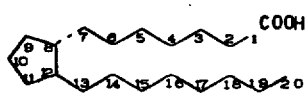

A systematic name for prostanoic acid is 7-[(2β-octyl)-cyclopent-1α-yl]heptanoic acid.

Prostaglandin $E_2$, $PGE_2$, has the following structure:

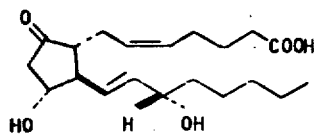

Prostaglandin $F_{2\alpha}$, $PGF_{2\alpha}$, has the following structure:

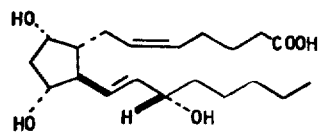

Prostaglandin $F_{2\alpha}$, $PGF_{2\alpha}$, has the following structure:

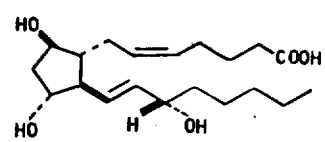

The prostaglandin formulas mentioned above each have several centers of asymmetry. Each formula represents a molecule of the particular optically active form of the prostaglandin obtained from certain mammalian tissues, for example, sheep vesicular glands, swine lung, and human seminal plasma, or by reduction or dehydration of a prostaglandin so obtained. See, for example, Bergstrom et al., Pharmacol. Rev. 20, 1 (1968), and references cited therein. The mirror image of each formula represents a molecule of the other enantiomeric form of that prostaglandin. The racemic form of the prostaglandin consists of equal numbers of two types of molecules, one represented by one of the above formulas and the other represented by the mirror image of that formula. Thus, both formulas are needed to define a racemic prostaglandin. See Nature 212, 38 (1966) for discussion of the stereochemistry of the prostaglandins.

In the formulas above, as well as in the formulas given hereinafter, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring. In the formulas above, the hydroxyl attachment to carbon 15 is in the alpha configuration, as indicated by the broken line. In formulas below, this convention is also used for intermediates having hydroxyl substitution at the corresponding position on the side chain. A wavy line ~ indicates optional attachment to carbon 15 in either alpha or beta configuration.

The various optically active and racemic prostaglandins and their alkyl esters are useful for various pharmacological purposes. With particular regard to $PGF_2$ see, for example, Bergstrom et al., Pharmacol. Rev. 20, 1 (1968), and references cited therein, Wiqvist et al., The Lancet, 889 (1970), and Karim et al., J. Obstet. Gynaec. Brit. Cwlth., 76, 769 (1969). As to the other prostaglandins, see, for example, Ramwell et al., Nature 221, 1251 (1969).

Previously, the preparation of an intermediate bicyclic lactone diol of the formula

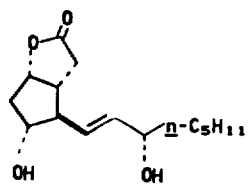

II was reported by E. J. Corey et al, J. Am. Chem. Soc. 91, 5675 (1969), and later disclosed in an optically active form by E. J. Corey et al, J. Am. Chem. Soc. 92, 397 (1970). Conversion of this intermediate to $PGE_2$ and $PGF_{2\alpha}$, either in racemic or optically active form, was disclosed in those publications.

SUMMARY OF THE INVENTION

It is the purpose of this invention to provide novel intermediates useful in the preparation of prostaglandins commercially in substantial amount, with high purity, and at reasonable cost. It is a further purpose to provide processes for preparing these intermediates and for utilizing them.

Thus there is provided an optically active compound of the formula

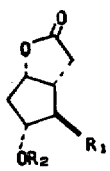

I or a racemic compound of that formula and the mirror image thereof, wherein $R_1$ is —$CH_2OH$ or —CHO, and $R_2$ is (1)

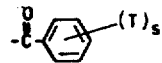

wherein T is alkyl of one to 4 carbon atoms, inclusive, phenyl alkyl of 7 to 10 carbon atoms, inclusive, or nitro, and s is zero to 5, inclusive, provided that not more than two T's are other than alkyl, and that the total number of carbon atoms in the T's does not exceed 10 carbon atoms;

wherein $R_3$ is alkyl of one to 4 carbon atoms, inclusive; or

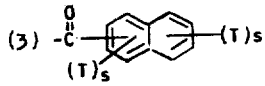

wherein T and s are as defined above.

Reference to Chart A, herein, will make clear the steps for preparing the Formula-I intermediates and for utilizing them for preparing the Formula-II bicyclic lactone diol, which is useful in producing prostaglandin products (see Corey et al., citations above).

The iodolactone of Formula III in Chart A is known in the art (see Corey et al, above). It is available in either racemic or optically active (+ or −) form. For racemic products, the racemic form is used. For prostaglandins of natural configuration, the laevorotatory form (−) is used.

In preparing the Formula-IV compound by replacing the hydrogen of the hydroxyl group in the 4-position with the acyl group $R_2$, methods known in the art are used. Thus, an aromatic acid of the formula $R_2OH$, wherein $R_2$ is as defined above, for example benzoic acid, is reacted with the Formula-III compound in the presence of a dehydrating agent, e.g. sulfuric acid, zinc chloride, or phosphoryl chloride; or an anhydride of the aromatic acid of the formula $(R_2)_2O$, for example benzoic anhydride, is used.

Preferably, however, an acyl halide, e.g. $R_2Cl$, for example benzoyl chloride, is reacted with the Formula-III compound in the presence of a hydrogen chloride-scavenger, e.g. a tertiary amine such as pyridine triethylamine, and the like. The reaction is carried out under a variety of conditions using procedures generally known in the art. Generally, mild conditions are employed, e.g. 20°–60°C., contacting the reactants in a liquid medium, e.g. excess pyridine or an inert solvent such as benzene, toluene or chloroform. The acylating agent is used either in stoichiometric amount or in excess.

As examples of $R_2$ for the purposes of this invention, the following are available as acids ($R_2OH$), anhydrides (($R_2)_2O$), or acyl chlorides ($R_2Cl$): benzoyl; substituted benzoyl, e.g. (2-, 3- or 4-)methylbenzoyl, (2-, 3-, or 4-)ethylbenzoyl, (2-, 3-, or 4-)isopropylbenzoyl, (2-, 3-, or 4-)tert-butylbenzoyl, 2,4-dimethylbenzoyl, 3,5-dimethylbenzoyl, 2-isopropyltoluyl, 2,4,6-trimethylbenzoyl, pentamethylbenzoyl, α-phenyl-(2-,3-, or 4-)toluyl, 2-,3-, or 4-phenethylbenzoyl, 2-, 3-, or 4-nitrobenzoyl, (2,4-, 2,5-, or 3,5-)dinitrobenzoyl, 3,4-dimethyl-2-nitrobenzoyl, 4,5-dimethyl-2-nitrobenzoyl, 2-nitro-6-phenethylbenzoyl, 3-nitro-2-phenethylbenzoyl; mono-esterified phthaloyl, e.g.

CHART A

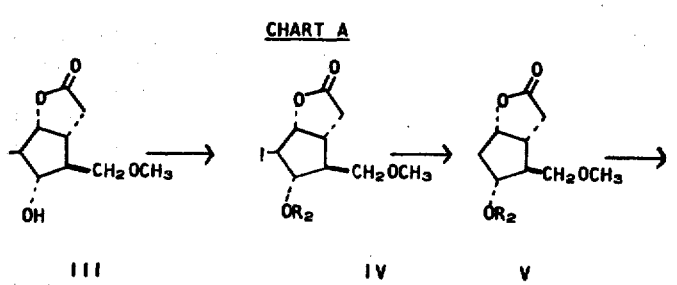

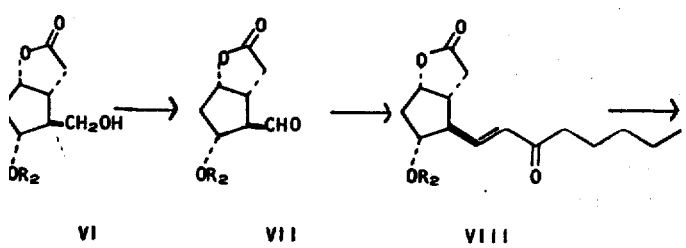

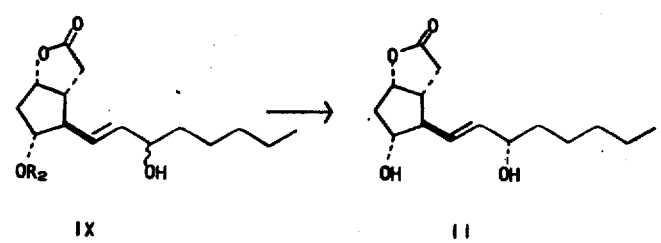

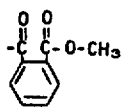

isophthaloyl, e.g.

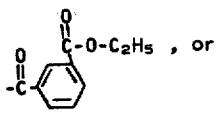, or or terephthaloyl, e.g.

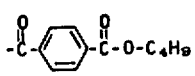

(1- or 2-)naphthoyl; and substituted naphthoyl, e.g. (2-, 3-, 4-, 5-, 6-, or 7-)-methyl-1-naphthoyl, (2- or 4-)ethyl-1-naphthoyl, 2-isopropyl-1-naphthoyl, 4,5-dimethyl-1-naphthoyl, 6-isopropyl-4-methyl-1-naphthoyl, 8-benzyl-1-naphthoyl, (3-, 4-, 5- or 8-)-nitro-1-naphthoyl, 4,5-dinitro-1-naphthoyl, (3-, 4-, 6-, 7- or 8-)methyl-1-naphthoyl, 4-ethyl-2-naphthoyl, and (5- or 8-)nitro-2-naphthoyl. There may be employed, therefore, benzoyl chloride, 4-nitrobenzoyl chloride, 3,5-dinitrobenzoyl chloride, and the like, i.e. $R_2Cl$ compounds corresponding to the above $R_2$ groups. If the acyl chloride is not available, it is made from the corresponding acid and phosphorus pentachloride as in known in the art. It is preferred that the $R_2OH$ $(R_2)_2O$, or $R_2Cl$ reactant does not have bulky, hindering substituents, e.g. tert-butyl, on both of the ring carbon atoms adjacent to the carbonyl attaching-site.

The Formula-V compound is next obtained by deiodination of IV using a reagent which does not react with the lactone ring or the $OR_2$ moiety, e.g. zinc dust, sodium hydride, hydrazine-palladium, hydrogen and Raney nickel or platinum, and the like. Especially preferred is tributyltin hydride in benzene at about 25° C. with 2,2'-azobis-(2-methylpropionitrile) as initiator.

The Formula-VI compound is obtained by demethylation of V with a reagent that does not attack the $OR_2$ moiety, for example boron tribromide or trichloride. The reaction is carried out preferably in an inert solvent at about 0°-5°C.

The Formula-VII compound is obtained by oxidation of the —CH$_2$OH of VI to —CHO, avoiding decomposition of the lactone ring. Useful for this purpose are dichromatesulfuric acid, Jones reagent, lead tetraacetate, and the like. Especially preferred is Collins' reagent (pyridineCrO$_3$) at about 0°-10° C.

The Formula-VIII compound is obtained by Wittig alkylation of VII, using the sodio derivative of dimethyl 2-oxoheptylphosphonate. The trans enone lactone is obtained stereospecifically (see D. H. Wadsworth et al, J. Org. Chem. vol 30, p. 680 (1965)).

The Formula-IX compound is obtained as a mixture of alpha and beta isomers by reduction of VIII.

For this reduction, use is made of any of the known ketonic carbonyl reducing agents which do not reduce ester or acid groups or carbon-carbon double bonds when the latter is undesirable. Examples of those are the metal borohydrides, especially sodium, potassium, and zinc borohydrides, lithium (tri-tert-butoxy) aluminum hydride, metal trialkoxy borohydrides, e.g., sodium trimethoxyborohydride, lithium borohydride, diisobutyl aluminum hydride, and when carbon-carbon double bond reduction is not a problem, the boranes, e.g., disiamylborane.

For production of natural-configuration prostaglandins, the desired alpha form of the Formula-IX compound is separated from the beta isomer by silica gel chromatography.

The Formula-II compound is then obtained by deacylation of IX with an alkali metal carbonate, for example potassium carbonate in methanoel at about 25° C.

Thus, there is provided a process for preparing a racemic or optically active bicyclic lactone diol of the formula

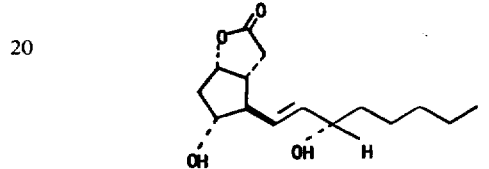

which comprises the steps of
a. oxidizing a racemic or optically active bicyclic alcohol of the formula

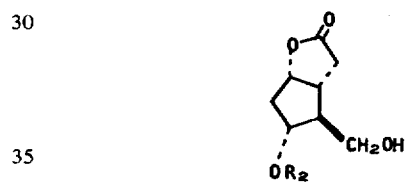

wherein $R_2$ is (1) 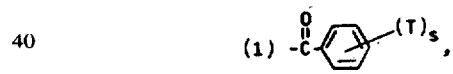

wherein T is alkyl of one to 4 carbon atoms, inclusive, phenylalkyl of 7 to 10 carbon atoms, inclusive, or nitro, and s is zero to 5, inclusive, provided that not more than two T's are other than alkyl, and that the total number of carbon atoms in the T's does not exceed 10 carbon atoms;

(2) 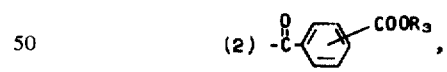

wherein $R_3$ is alkyl of one to 4 carbon atoms, inclusive; or (3)

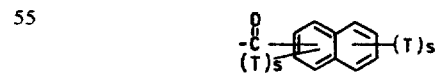

wherein T and s are as defined above, to a racemic or optically acitve bicyclic aldehyde of the formula

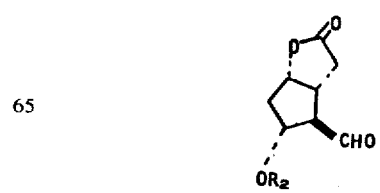

wherein $R_2$ is as defined above;
  b. transforming the racemic or opticaly active bicyclic aldehyde to a racemic or optically active bicyclic enone of the formula

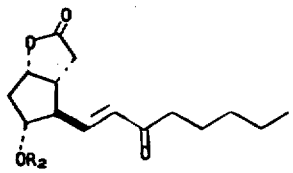

wherein $R_2$ is as defined above;
  c. reducing the racemic or optically active bicyclic enone to a racemic or optically active bicyclic hydroxy lactone of the formula

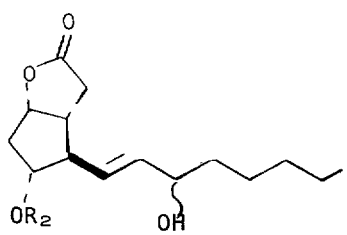

wherein $R_2$ is as defined above and ~ is alpha or beta;
  d. separating the alpha and beta isomers of the racemic or optically active bicyclic hydroxy lactone; and
  e. replacing the $R_2$ substituent of the alpha isomer of the racemic or optically active bicyclic hydroxy lactone with hydrogen.

I have found, surprisingly, that the novel intermediates of this invention are generally crystalline materials, unlike the prior art materials which are usually oils. The present intermediates are, therefore, readily purified by recrystallization if desired, thereby leading to prostaglandins of high purity. Furthermore, I have found that certain of these intermediates, e.g. the Formula-VII aldehydes, have greatly enhanced stability over prior art comparable compounds, and thereby lead to final product prostaglandins in greater yield at reduced cost. Furthermore, among the numerous advantages over the prior art, the use of these intermediates, e.g. the Formula-VIII compounds wherein $R_2$ is benzoyl, results unexpectedly in a high ratio of desired alpha-isomer Formula-IX product to beta-isomer Formula-IX product than by use of prior art intermediates.

DESCRIPTION OF THE PREFERRED EMBODIMENTS

The invention can be more fully understood by the following examples and preparations:

All temperatures are in degrees centigrade.

Infrared absorption spectra are recorded on a PerkinElmer model 421 infrared spectrophotometer. Except when specified otherwise, undiluted (neat) samples are used.

NMR spectra are recorded on a Varian A-60 spectrophotometer on deuterochloroform solutions with tetramethylsilane as an internal standard (downfield).

Mass spectra are recorded on an Atlas CH-4 mass spectrometer with a TO-4 source (ionization voltage 70 ev).

EXAMPLE 1

2-Hydroxy-3-iodo-4-benzoxy-5-methoxymethylcyclopentanyl Acetic Acid γ-Lactone (Formula IV: $R_2$ is benzoyl).

Refer to Chart A. To a mixture of optically active laevorotatory (−) iodolactone III (E. J. Corey et al, J. Am. Chem. Soc. Vol. 92, p. 397 (1970), 75 g.) in 135 ml. of dry pyridine under a nitrogen atmosphere is added 30.4 ml. of benzoyl chloride with cooling to maintain the temperature at about 20°–40° C. Stirring is continued for an additional 30 min. About 250 ml. of toluene is added and the mixture concentrated under reduced pressure. The residue is dissolved in one 1. of ethyl acetate, washed with 10% sulfuric acid, brine, aqueous saturated sodium bicarbonate, and brine. The ethyl acetate solution is dried over sodium sulfate and concentrated under reduced pressure to yield an oil, 95 g. Crystallization of the oil yields the title compound, m.p. 84°–86° C.; $[\alpha]_D + 7°$ (CHCl$_3$); infrared spectral absorptions at 1768, 1722, 1600, 1570, 1490, 1275, 1265, 1180, 1125, 1090, 1060, 1030, and 710 cm$^{-1}$; and NMR (nuclear magnetic resonance) peaks at 2.1–3.45, 3.3, 3.58, 4.38, 5.12, 5.51, 7.18–7.58, and 7.83–8.05 δ.

Following the procedures of Example 1, the Formula-III iodolactone is transformed to a Formula-IV compound using, instead of benzoyl chloride, an $R_2$Cl reactant wherein $R_2$ is substituted benzoyl, e.g. (2-, 3- or 4-)methylbenzoyl, (2-, 3-, or 4-)ethylbenzoyl, (2-, 3-, or 4-)-isopropylbenzoyl, (2-, 3-, or 4-)tert-butylbenzoyl, 2,4-dimethylbenzoyl, 3,5-dimethylbenzoyl, 2-isopropyltoluyl, 2,4,6-trimethylbenzoyl, pentamethylbenzoyl, α-phenyl-(2-, 3-, or 4-)toluyl, 2-, 3-, or 4-phenethylbenzoyl, 2-, 3-, or 4-nitrobenzoyl, (2,4-, 2,5-, or 3,5-)dinitrobenzoyl, 3,4-dimethyl-2-nitrobenzoyl, 4,5-dimethyl-2-nitrobenzoyl, 2-nitro-6-phenethylbenzoyl, 3-nitro-2-phenethylbenzoyl; mono-esterified phthaloyl, e.g.

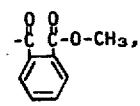

isophthaloyl, e.g.

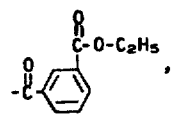

or terephthaloyl, e.g.

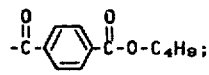

(1- or 2-)naphthoyl; and substituted naphthoyl, e.g. (2-, 3-, 4-, 5-, 6-, or 7-)methyl-1-naphthoyl, (2- or 4-)ethyl-1-naphthoyl, 2-isopropyl-1-naphthoyl, 4,5-dimethyl-1-naphthoyl, 6-isopropyl-4-metheyl-1-naphthoyl, 8-benzyl-1-naphthoyl, (3-, 4-, 5- or 8-)nitro-1-naphthoyl, 4,5-dinitro-1-naphthoyl, (3-, 4-, 6-, 7- or 8-)methyl-1-naphthoyl, 4-ethyl-2-naphtnoyl, and (5- or 8-)nitro-2-naphthoyl.

EXAMPLE 2

2-Hydroxy-4-benzoxy-5-methoxymethylcyclopentanyl Acetic Acid γ-lactone (Formula V: $R_2$ is benzoyl).

Refer to Chart A. To a solution of the Formula-IV benzoxy compound (Example 1, 60 g.) in 240 ml. of dry benzene is added 2,2'-azobis-(2-methylpropionitrile) (approximately 60 mg.). The mixture is cooled to 15° C. and to it is added a solution of 75 g. tributyltin hydride in 600 ml. of ether, with stirring, at such a rate as to maintain continuous reaction at about 25° C. When the reaction is complete as shown by TLC (thin layer chromatography) the mixture is concentrated under reduced pressure to an oil. The oil is mixed with 600 ml. of Skellysolve B (isomeric hexanes) and 600 ml. of water and stirred for 30 min. The water layer, containing the product, is separated, then combined with 450 ml. of ethyl acetate and enough solid sodium chloride to saturate the aqueous phase. The ethyl acetate layer, now containing the product is separated, dried over magnesium sulfate, and concentrated under reduced pressure to an oil, 39 g. of the title compound. An analytical sample gave $[\alpha]_D$ −99° ($CHCl_3$); infrared spectral absorptions at 1775, 1715, 1600, 1585, 1490, 1315, 1275, 1180, 1110, 1070, 1055, 1025 and 715 $cm^{-1}$; NMR peaks at 215–3.0, 3.25, 3.34, 4.84–5.17, 5.17–5.4, 7.1–7.5, and 7.8–8.05 δ; and mass spectral peaks at 290, 168, 105, and 77.

Following the procedures of Example 2, each of the Formula-IV compounds following Example 1 is transformed to the corresponding Formula-V compound.

EXAMPLE 3

2-Hydroxy-4-benzoxy-5-hydroxymethyl-cyclopentanyl Acetic Acid γ-Lactone (Formula VI: $R_2$ is benzoyl).

Refer to Chart A. To a cold (0°–5° C.) solution of lactone V (Example 2, 20 g.) in 320 ml. of methylene chloride under nitrogen is added a solution of 24.8 ml. of boron tribromide in 320 ml. of dichloromethane, dropwise with vigorous stirring over a period of 50 min. at 0°–5° C. Stirring and cooling are continued for 1 hr. When the reaction is complete, as shown by TLC, there is cautiously added a solution of sodium carbonate (78 g. monohydrate) in 200 ml. of water. The mixture is stirred at 0°–5° C. for 10–15 min, saturated with sodium chloride, and the dichloro methane layer separated. Additional ethyl acetate extractions of the water layer are combined with the dichloro methane solution. The combined solutions are rinsed with brine, dried over sodium sulfate and concentrated under reduced pressure to an oil, 18.1 g. of the title compound. An analytical sample has m.p. 116°–118° C.; $[\alpha]_D$ −80° ($CHCl_3$); infrared spectral absorptions at 3460, 1735, 1708, 1600, 1580, 1490, 1325, 1315, 1280, 1205, 1115, 1090, 1070, 1035, 1025, 730, and 720; and NMR peaks at 2.1–3.0, 3.58, 4.83–5.12, 5.2–5.45, 7.15–7.55, and 7.8–8.0 ε.

Following the procedures of Example 3, each of the Formula-V compounds following Example 2 is transformed to the correspnding Formula-VI hydroxymethyl compound.

EXAMPLE 4

2-Hydroxy-4-benzoxy-5-carboxaldehyde-cyclopentanyl Acetic Acid γ-Lactone (Formula VII: $R_2$ is benzoyl) and 2-Hydroxy-4-benzoxy-5-(1'-trans-3'-oxo-octenyl-)-cyclopentanyl Acetic Acid γ-Lactone (Formula VIII: $R_2$ is benzoyl).

Refer to Chart A. To a mixture of 150 ml. of dry dichloromethane and Collins' reagent (J. C. Collins et al, Tetrahedron Lett. 3363 (1968), 28 g.) at about 10° C. under nitrogen is added, with vigorous stirring, a cold (10° C.) solution of the hydroxymethyl lactone VI (Example 3, 5.0 g.) in 150 ml. of dichloromethane. After 5-min. additional stirring, about 100 ml. of dry benzene is added, the mixture is filtered, and the solution is concentrated under reduced pressure. The volume is brought to about 150 ml. with benzene. The solution of the Formula-VII title compound is used directly.

From a similar run, there is obtained by concentration of the benzene solution under reduced pressure an oil which, on trituration with ether, yields crystals of the Formula-VII product, m.p. 115° C. (dec.); and having NMR peaks at 1.8–3.7, 4.9–5.2, 5.54–5.77, 7.2–7.6, 7.7–8.0, and 9.8 δ. Meanwhile there has been prepared a suspension of the Wittig reagent as follows.

To a cold (5° C.) mixture of sodium hydride (1.75 g. of 50%) in 250 ml. of dry tetrahydrofuran under nitrogen is added dimethyl 2-oxoheptylphosphonate (Corey et al, J. Amer. chem. Soc. 90, 3247 (1968) in portions over a 2–3 min. period. Stirring is continued at about 25° C. for at least 1 hr. The mixture is cooled to 0° C., and to it is added the benzene solution above. Stirring is continued at about 25° C. for 1.5 hrs. About 3 ml. of acetic acid is added dropwise. The mixture is concentrated under reduced pressure and the residue is dissolved in 400 ml. of ethyl acetate. The ethyl acetate solution is washed with water, and brine, then dried over sodium sulfate, and concentrated under reduced pressure. The residue is dissolved in 50 ml. of dichloromethane and chromatographed on silica gel (500 g.) by elution gradient with 25–30% ethyl acetate in Skellysolve B. Those fractions shown by TLC ($R_f$=0.58 in the IXsystem) to be free of starting material ($R_f$=0.31) are combined and concentrated to an oil of the title Formula-VIII compound, 4.0 g. The oil yields crystals, m.p. 63°–65° C., $[\alpha]_D$ = −84° ($CHCl_3$); infrared spectral absorptions at 1775, 1720, 1670, 1630, 1600, 1585, 1490, 1315, 1275, 1175, 1115, 1070, 1050, 1025, 980, and 715 $cm^{-1}$; NMR peaks at 0.7–1.9, 2.2–3.1, 4.9–5.45, 6.17, 6.71, 7.2–7.6, and 7.8–8.1 δ; and mass spectral peaks at 370, 314, 248, 192, and 177.

Following the procedures of Example 4, each of the Formula-VI compounds following Example 3 is transformed to the corresponding Formula-VII aldehyde compound and then to the correspnding Formula-VIII compound.

EXAMPLE 5

2-Hydroxy-4-benzoxy-5-(1'-trans-3'α-hydroxyoctenyl)cyclopentanyl Acetic Acid γ-Lactone (Formulal IX: $R_2$ is benzoyl and ~ is alpha or beta).

Refer to Chart A. To a mixture of zinc borohydride prepared from zinc chloride (anhydrous, 19 g.) and sodium borohydride (4.3 g.) in 120 ml of dry 1,2-dimethoxyethane under nitrogen stirred for 20 hrs. and then cooled to −20° C., is added the Formula-VIII ketone (Example 4, 10.5 g.) in 55 ml. of 1,2-dimethoxyethane. The mixture is stirred at −20° C. for 17 hrs., warmed to room temperature and stirred until reaction is complete as shown by TLC. The mixture is cooled to 0°–5° C., and 30 ml. of water added dropwise. After hydrolysis is complete, the mixture is shaken with 200 ml. of ethyl acetate and separated. The ethyl acetate layer is washed with brine, dried over sodium sulfate, and concentrated under reduced pressure to 11.6 g. product. The α and β isomers are separated by chromatography on a silica gel column by elution gradient with 35–60% ethyl acetate in Skellysolve B. Fractions containing the α or β isomers, as shown by TLC, are combined and concentrated to yield, respectively, 5.1 g. of Formula-IX product where ~ is α, and 4.15 g. of Formula-IX product where ~ is β. The IX-α product has m.p. 71°–72° C., $[\alpha]_D$ −3480, (CHCl$_3$); infrared spectral absorption at 34,80, 1775, 1720, 1600, 1585, 1490, 1315, 1275, 1175, 1115, 1070, 1050, 1025, 970, and 715; NMR peaks at 0.6–1.6, 1.9–3.0, 3.85–4.17, 4.85–5.35, 5.45–5.68, 7.2–7.55, and 7.8–8.05 δ; and mass spectral peaks at 301, 250, 179, and 105. The IX-β product has m.p. 77°–78° C., $[\alpha]_D$ −86° (CHCl$_3$); and infrared and NMR spectra essentially identical with the IX-α product.

Following the procedures of Example 5, each of the Formula-VIII compounds following Example 4 is transformed to the corresponding Formula-IX compound.

EXAMPLE 6

2,4-Dihydroxy-5-(1′-trans-3′α-hydroxy-octenyl)-cyclopentanyl Acetic Acid γ-Lactone (Formula II: ~ is alpha).

To a solution of the Formula-IX benzoxy hydroxyoctenyl compound (Example 5, 18 g.) in 210 ml. of methanol under nitrogen is added potassium carbonate (6.75 g.) and the mixture is stirred vigorously for 1 hr. About 210 ml. of chloroform is added and the mixture is filtered. The filtrate is concentrated under reduced pressure to a volume of about 50 ml., then made up to a volume of about 230 ml. with chloroform, washed with brine, dried over sodium sulfate, filtered and concentrated under reduced pressure to an oil, 10.7 g. The oil is triturated with Skellysolve B, then concentrated to the Formula II title compound. An analytical sample has $[\alpha]_D$ −7° (CHCl$_3$); infrared spectral absorption at 3390, 1760, 1175, 1085, 1035, 970, and 905 cm$^{-1}$; and NMR peaks at 0.9, 1.0–1.7, 1.8–2.9, 3.8–4.2, 4.7–5.0, and 5.4–5.6 δ.

Following the procedure of Example 6, each of the Formula-IX compounds following Example 5 is transformed to the Formula-II compound.

The Formula-II alpha compound is transformed to useful prostaglandins PGE$_2$ and PGF$_{2\alpha}$ by methods known in the art (see E. J. Corey et al., cited above).

I claim:
1. An optically active compound of the formula

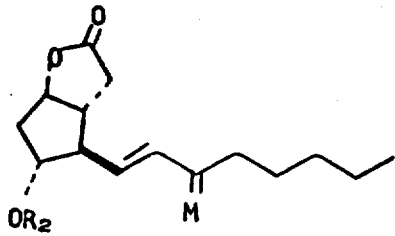

or a racemic compound of that formula and the mirror image thereof, wherein R$_2$ is

wherein T is alkyl of one to 4 carbon atoms, inclusive, phenylalkyl of 7 to 10 carbon atoms, inclusive, or nitro, and s is zero to 5, inclusive, provided that not more than two T's are other than alkyl, and that the total number of carbon atoms in the T's does not exceed 10 carbon atoms; (2)

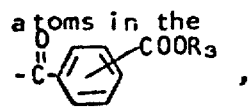

wherein R$_3$ is alkyl of one to 4 carbon atoms, inclusive; or

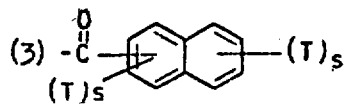

wherein T and s are as defined above; and M is O =, or

2. A compound according to claim 1 wherein M is O =.

3. A compound according to claim 1 wherein M is O = and R$_2$ is benzoyl.

4. A compound according to claim 1 wherein M is

5. A compound according to claim 1 wherein M is

and R$_2$ is benzoyl.

* * * * *

UNITED STATES PATENT OFFICE
CERTIFICATE OF CORRECTION

PATENT NO. : 3,901,923
DATED : August 26, 1975
INVENTOR(S) : Udo F. Axen

It is certified that error appears in the above-identified patent and that said Letters Patent are hereby corrected as shown below:

Column-Abstract-cancel "M is O=, or" first occurence. Column 1, line 41, "Prostaglandin $F_{2\alpha}$, $PGF_{2\alpha}$" should read -- Prostaglandin $F_{2\beta}$, $PGF_{2\beta}$ --. Column 2, line 18, "$PGF_2$" should read -- $PGF_{2\alpha}$ --. Column 9, line 57, "$\epsilon$" should read -- $\delta$ --. Column 11, line 10, "$[\alpha]_D$ -3,480" should read -- $[\alpha]_D$ -68° --; line 11 "34,80" should read -- 3480 --. Column 12, line 15 cancel "atoms in the".

Signed and Sealed this first Day of June 1976

[SEAL]

Attest:

RUTH C. MASON
Attesting Officer

C. MARSHALL DANN
Commissioner of Patents and Trademarks